L. COTÉ.
Machinery for Molding Boot and Shoe Stiffeners.
No. 212,132. Patented Feb. 11, 1879.
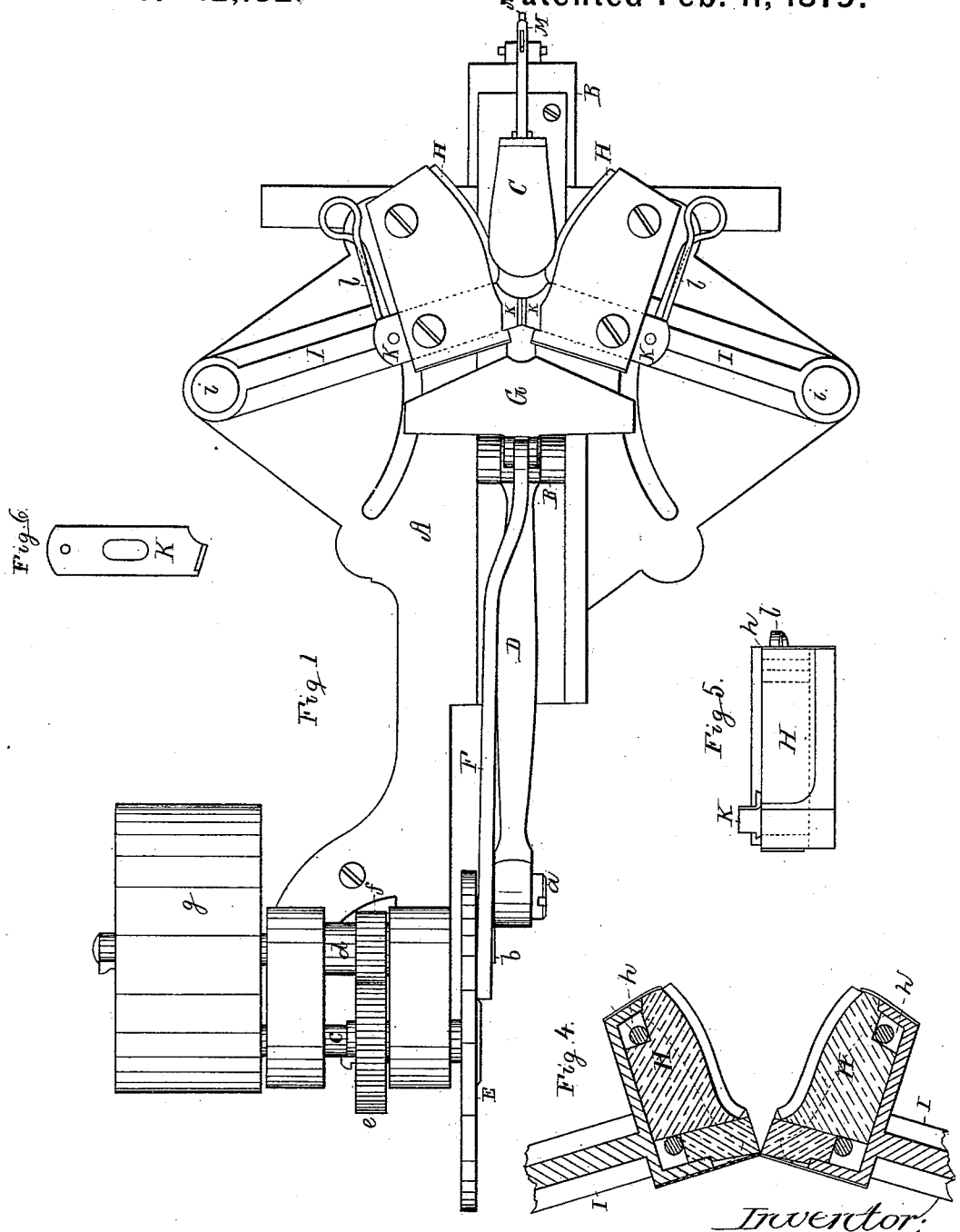

2 Sheets—Sheet 2.
L. COTÉ.
Machinery for Molding Boot and Shoe Stiffeners.
No. 212,132. Patented Feb. 11, 1879.
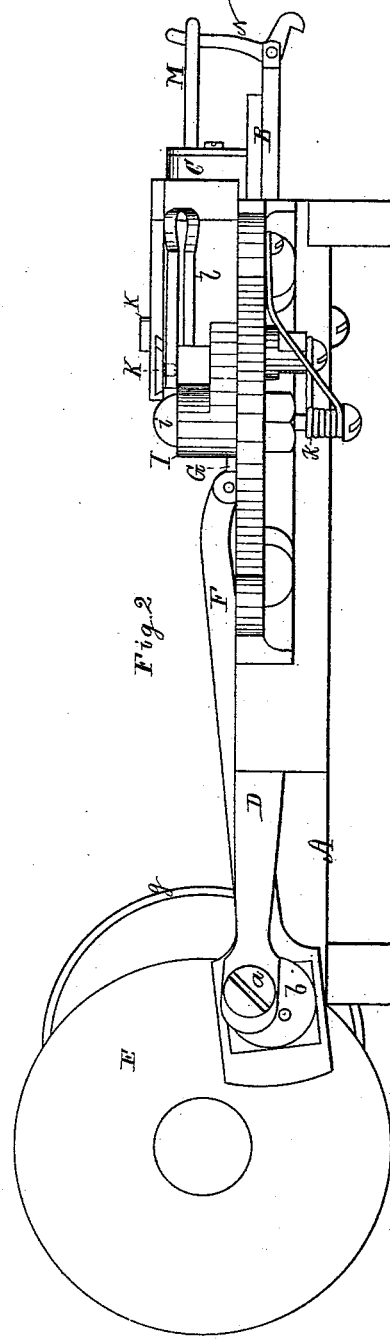
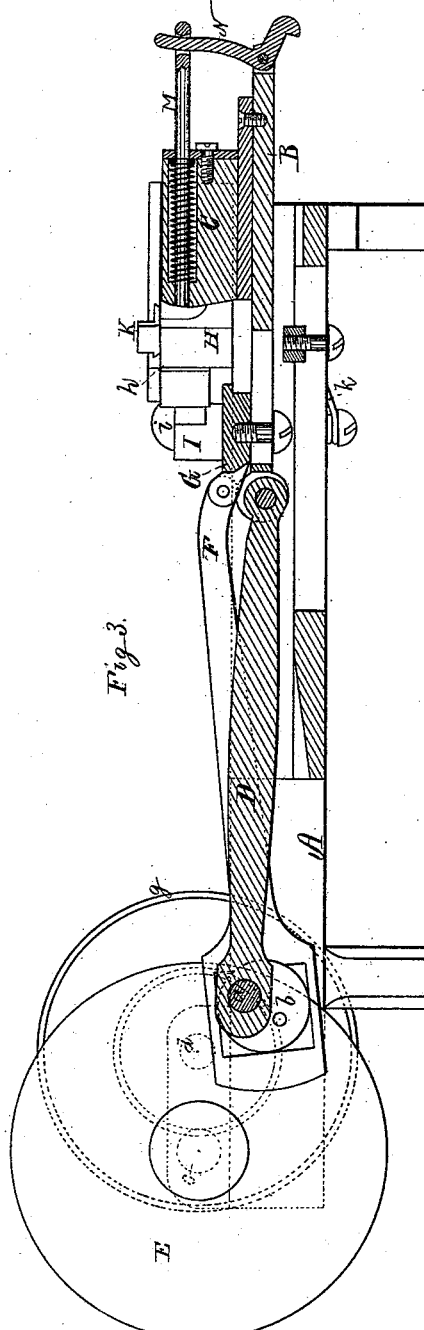
Witnesses.
S. N. Piper.
Wm. C. Winslow.
Inventor:
Louis Coté.
by his attorney,
R. H. Eddy

UNITED STATES PATENT OFFICE.

LOUIS COTÉ, OF ST. HYACINTHE, QUEBEC, CANADA.

IMPROVEMENT IN MACHINERY FOR MOLDING BOOT AND SHOE STIFFENERS.

Specification forming part of Letters Patent No. 212,132, dated February 11, 1879; application filed January 2, 1879.

*To all whom it may concern:*

Be it known that I, LOUIS COTÉ, of St. Hyacinthe, of the Province of Quebec, of the Dominion of Canada, have invented a new and useful Improvement in Machinery for Molding Boot and Shoe Stiffeners or Counters; and do hereby declare the same to be described in the following specification, and represented in the accompanying drawings, of which—

Figure 1 is a top view, Fig. 2 a side elevation, and Fig. 3 a longitudinal section, of a machine containing my invention. Fig. 4 is a horizontal section of the two jaw-carriers and their india-rubber or elastic-surface jaws. Fig. 5 is an inner end view of one of the said carriers and its elastic jaw. Fig. 6 is a top view of one of the counter-flange benders applied to the jaw-carrier.

One important element of the said machine, by which it is distinguished from others of like character, is its india-rubber or elastic-surface jaws, combined and to operate with flange-benders and a last or former in effecting the bending or molding of the counter-blank, and the turning of its flange to such last or former, these jaws being blocks or masses of india-rubber, or other equivalent material, arranged in and supported by pivoted arms or carriers.

In molding a counter, the last moves between and with the elastic jaws, which press the counter-blank against the last, and, by their elasticity, readily adjust themselves to the varying thickness of the blank, the flange or lip of the blank being turned in the meantime by benders arranged with the jaws and in their carriers, and having operative springs, substantially as hereinafter explained.

Furthermore, there are in the machine, besides the above-enumerated operative parts, a movable abutment and a last-carriage provided with operative mechanism, as set forth.

In the drawings, A denotes the frame or table of the machine, there being within such frame a carriage or slide, B, which should be so applied to the frame as to be capable of being moved forward and backward horizontally and rectilinearly therein, it being sustained by suitable guides to preserve it in such a path of movement. This carriage has the last or former C projecting upward from it.

To the rear end of the said carriage or slide a connecting-rod, D, is pivoted, it being also pivoted to a crank-pin, *a*, extending from a wheel, E, which also is provided with an eccentric, *b*, arranged with such pin and within another connecting-rod, F, in manner as represented. This latter connecting-rod F, at its front end, is pivoted to the movable jaw-carrier abutment G, arranged on the top of the table and formed as represented.

The crank-wheel E is fixed on a secondary shaft, *c*, which engages with a driving-shaft, *d*, by means of gears *e f*, all being as represented, the driving-shaft being furnished with a pulley, *g*, as shown.

The india-rubber or elastic-surface jaws are shown at H H, they being arranged in suitable sockets *h h* of two radial arms, I I, disposed with the last C, and connected to the frame A by pivots or bolts *i i*, as shown.

Each arm I has a spring, *k*, applied to it, to force it back from the last. These springs move the jaw-carriers, so as to force the elastic jaws into proper contact.

Furthermore, there is within each of the jaw-carriers or sockets *h h*, and over its elastic or rubber jaw, a metallic plate or flange-bender, K, which is provided with a spring, *l*, to force it toward and against its fellow, such spring being fastened to and projecting from the arm I of such carrier.

There is to the last a slide-rod or counter-discharger, M, which is arranged with and applied to a hooked lever, N, pivoted to the slide or carriage of the last. This discharger and its actuating-lever constitute no part of my invention, such or equivalent devices being used for like purposes in other counter-machines.

The jaw-carriers, after the discharge of the counter, are, with the last and the abutment, moved forward to their proper places for another blank to be placed between the last and the jaws.

Sometimes I rest the last upon a bed of india-rubber, or on a suitable spring or springs, to enable it to give down and accommodate itself to the varying thickness of the blank in the part thereof to constitute the flange or lip.

When the machine is ready for reception of a counter-blank, the latter should be so inserted between the last and the two jaws that the middle of the blank shall be against the middle of the rear end of the last. This having been done, the jaw-carriers will be held stationary by the abutment until the last may have been moved backward sufficiently to crowd the blank firmly up to the jaws, after which the last, the abutment, and the jaw-carriers will be simultaneously moved or drawn backward, the blank in the meantime being molded against the last, the flange or lip being also turned over the sole or upper surface of the last by the flange-benders.

I do not claim inelastic-surface jaws to operate with a former in molding a shoe-counter, such inelastic-surface jaws being supported against springs, to force them against the counter-blank while it may be in the act of being molded on the last or former; nor do I claim elastic surface jaws with a former unprovided with means of flanging the counter; but

I claim as my invention as follows, viz:

1. The combination of the last or former, having mechanism for operating it, as described, with the india-rubber or elastic-surface jaws and their pivoted carrying-arms, and with the flange-benders and their operative springs, all being arranged and applied substantially as set forth.

2. The combination of the movable abutment, having mechanism for operating it, as explained, with the last or former and its carriage, cranked wheel, and connecting-rod, and with the elastic jaws and their pivoted arms or carriage, as explained.

3. The combination of the movable abutment, having mechanism for operating it, as explained, with the last or former, and its carriage, cranked wheel, and connecting-rod, and with the elastic jaws and their pivoted arms or carriers, and the flange-benders, all being substantially as specified.

LOUIS COTÉ.

Witnesses:
R. H. EDDY,
S. N. PIPER.